United States Patent
Terao (10) Patent No.: US 11,745,648 B1
(45) Date of Patent: Sep. 5, 2023

(54) VEHICLE APPROACH NOTIFICATION DEVICE AND PICKING TRUCK EQUIPPED WITH THE DEVICE

(71) Applicant: Mitsubishi Logisnext Co., Ltd., Kyoto (JP)

(72) Inventor: Ryohei Terao, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 0 days.

(21) Appl. No.: 18/167,889

(22) Filed: Feb. 13, 2023

(30) Foreign Application Priority Data

Nov. 4, 2022 (JP) ................................ 2022-177380

(51) Int. Cl.
*B60Q 1/50* (2006.01)
*B60Q 1/26* (2006.01)
*B60Q 1/28* (2006.01)
*B60Q 1/46* (2006.01)
*B60Q 1/30* (2006.01)
*B66F 9/06* (2006.01)

(52) U.S. Cl.
CPC ........... *B60Q 1/543* (2022.05); *B60Q 1/2692* (2013.01); *B60Q 1/28* (2013.01); *B60Q 1/30* (2013.01); *B60Q 1/46* (2013.01); *B60Q 2400/20* (2013.01); *B66F 9/06* (2013.01)

(58) Field of Classification Search
CPC ........ B60Q 1/543; B60Q 1/2692; B60Q 1/28; B60Q 1/30; B60Q 1/46
See application file for complete search history.

(56) References Cited

U.S. PATENT DOCUMENTS

| 3,925,759 A * | 12/1975 | Lucas ...................... B60Q 1/46 340/471 |
| 5,495,400 A * | 2/1996 | Currie ................... F21S 43/247 362/540 |
| 6,758,718 B1 * | 7/2004 | Morris ................... A63H 17/32 446/431 |
| 2003/0006908 A1 * | 1/2003 | Wilson ................... B60Q 1/544 340/901 |
| 2015/0165963 A1 * | 6/2015 | Salter ..................... B60Q 1/307 315/77 |

(Continued)

FOREIGN PATENT DOCUMENTS

JP 6984987 12/2021

*Primary Examiner* — Bryon T Gyllstrom
(74) *Attorney, Agent, or Firm* — JCIPRNET (57) ABSTRACT

The disclosure provides a vehicle approach notification device and a picking truck. The vehicle approach notification device includes a first illumination portion provided on a cab capable of elevation; a second and a third illumination portion provided on a vehicle body incapable of elevation; and a control unit that (1) turns on the first illumination portion and off other illumination portions when a travel state of the vehicle body is backward travel and an elevation position is lower than a predetermined threshold value; (2) turns on the second illumination portion and off other illumination portions when the travel state is backward travel and the elevation position is equal to or higher than the threshold value; (3) turns on the third illumination portion and off other illumination portions when the travel state of vehicle is forward travel; and (4) turns off all illumination portions when the travel state is travel stop.

16 Claims, 6 Drawing Sheets

(56) References Cited

U.S. PATENT DOCUMENTS

| | | | |
|---|---|---|---|
| 2015/0291086 A1* | 10/2015 | Salter | B60Q 3/30 |
| | | | 362/485 |
| 2016/0258591 A1* | 9/2016 | Salter | F21S 43/16 |
| 2018/0099602 A1* | 4/2018 | Salter | B60P 3/0257 |
| 2021/0039722 A1* | 2/2021 | Williamson | B62D 33/0273 |
| 2021/0049909 A1* | 2/2021 | Tucker | B60W 30/16 |

* cited by examiner

(A) Forward travel (B) Travel Stop (C) Backward travel

(A) Forward travel (B) Travel Stop (C) Backward travel

VEHICLE APPROACH NOTIFICATION DEVICE AND PICKING TRUCK EQUIPPED WITH THE DEVICE

CROSS-REFERENCE TO RELATED APPLICATION

This application claims the priority benefits of Japanese application no. 2022-177380, filed on Nov. 4, 2022. The entity of the above-mentioned patent application is hereby incorporated by reference herein and made a part of this specification.

BACKGROUND

Technical Field

The disclosure relates to a vehicle approach notification device that notifies a person near an approaching vehicle by irradiating light onto a road surface around the vehicle, and a picking truck equipped with the device.

Related Art

Conventionally, there has been known a picking truck equipped with a vehicle approach notification device including a first illumination portion and a second illumination portion (see, for example, Patent Literature 1: JP 6984987). The first illumination portion is provided on a cab capable of elevation in a vehicle, and irradiates a first notification light toward a road surface behind the vehicle when an elevation position of the cab is lower than a predetermined threshold value, that is, at low lifting height. On the other hand, the second illumination portion is provided on a vehicle body incapable of elevation in the vehicle, and irradiates a second notification light toward the road surface behind the vehicle when an elevation position of the cab is equal to or higher than a threshold value, that is, at high lifting height. According to this vehicle approach notification device and the picking truck, in the case of high lifting height in which the first notification light from the first illumination portion is not delivered to the road surface sufficiently, the second illumination portion irradiates the second notification light toward the road surface instead of the first illumination portion, thereby reliably notifying a person in the vicinity of approach of a vehicle.

However, the conventional vehicle approach notification device and picking truck described above do not provide sufficient notification to the front of the vehicle.

The disclosure has been made in view of the above circumstances, and an object of the disclosure is to provide a vehicle approach notification device and a picking truck capable of reliably notifying a person near the vehicle of the approach of the vehicle.

SUMMARY

A vehicle approach notification device according to the disclosure includes a first illumination portion provided in a cab capable of elevation in a vehicle and irradiating a first notification light toward a rear road surface, which is a road surface behind the vehicle; a second illumination portion provided on a vehicle body incapable of elevation in the vehicle and irradiating a second notification light toward the rear road surface; a third illumination portion provided on the vehicle body and irradiating a third notification light toward a front road surface, which is a road surface in front of the vehicle; and a control unit controlling a lighting state of the first illumination portion, the second illumination portion, and the third illumination portion according to a travel state of the vehicle body and an elevation position of the cab. The control unit (1) turns on the first illumination portion and turns off the second illumination portion and the third illumination portion when the travel state is backward travel and the elevation position is lower than a predetermined threshold value; (2) turns off the first illumination portion and the third illumination portion and turns on the second illumination portion when the travel state is backward travel and the elevation position is equal to or higher than the threshold value; (3) turns off the first illumination portion and the second illumination portion and turns on the third illumination portion when the travel state of the vehicle is forward travel; (4) turns off the first illumination portion, the second illumination portion, and the third illumination portion when the travel state is travel stop and the elevation position is lower than the threshold value; and (5) turns off the first illumination portion and turns off, blinks, or turns on the second illumination portion and the third illumination portion when the travel state is travel stop and the elevation position is equal to or higher than the threshold value.

Moreover, a picking truck according to the disclosure includes a vehicle body including a travel device, a mast provided behind the vehicle body; a cab capable of elevation along the mast; a first illumination portion provided in the cab and irradiating a first notification light toward a rear road surface, which is a road surface behind a vehicle; a second illumination portion provided on the vehicle body and irradiating a second notification light toward the rear road surface; a third illumination portion provided on the vehicle body and irradiating a third notification light toward a front road surface, which is a road surface in front of the vehicle; and a control unit controlling a lighting state of the first illumination portion, the second illumination portion, and the third illumination portion according to a travel state of the vehicle body and an elevation position of the cab. The control unit (1) turns on the first illumination portion and turns off the second illumination portion and the third illumination portion when the travel state is backward travel and the elevation position is lower than a predetermined threshold value; (2) turns off the first illumination portion and the third illumination portion and turns on the second illumination portion when the travel state is backward travel and the elevation position is equal to or higher than the threshold value; (3) turns off the first illumination portion and the second illumination portion and turns on the third illumination portion when the travel state of the vehicle is forward travel; (4) turns off the first illumination portion, the second illumination portion, and the third illumination portion when the travel state is travel stop and the elevation position is lower than the threshold value; and (5) turns off the first illumination portion, and turns off, blinks, or turns on the second illumination portion and the third illumination portion when the travel state is travel stop and the elevation position is equal to or higher than the threshold value.

BRIEF DESCRIPTION OF THE DRAWINGS

(A) of FIG. 3 is a graph showing changes in lighting state and irradiation distance of each illumination portion according to an embodiment of the disclosure when a travel state is forward travel; (B) of FIG. 3 is a graph showing changes in lighting state and irradiation distance of each illumination portion according to an embodiment of the disclosure when a travel state is travel stop; and (C) of FIG. 3 is a graph showing changes in lighting state and irradiation distance of each illumination portion according to an embodiment of the disclosure when a travel state is backward travel.

(A) of FIG. 4 is a schematic side view of a picking truck at low lifting height according to an embodiment of the disclosure; and (B) of FIG. 4 is a schematic side view of a picking truck at high lifting height according to an embodiment of the disclosure.

(A) of FIG. 5 is a graph showing changes in lighting state and irradiation distance of each illumination portion in a modified example of the disclosure when a travel state is forward travel; (B) of FIG. 5 is a graph showing changes in lighting state and irradiation distance of each illumination portion in a modified example of the disclosure when a travel state is travel stop, and (C) of FIG. 5 is a graph showing changes in lighting state and irradiation distance of each illumination portion in a modified example of the disclosure when a travel state is backward travel.

(A) of FIG. 6 is a graph showing changes in the lighting state and irradiation distance of each illumination portion in another modified example of the disclosure when a travel state is forward travel; (B) of FIG. 6 is a graph showing changes in the lighting state and irradiation distance of each illumination portion in another modified example of the disclosure when a travel state is travel stop, and (C) of FIG. 6 is a graph showing changes in the lighting state and irradiation distance of each illumination portion in another modified example of the disclosure when a travel state is backward travel.

DESCRIPTION OF THE EMBODIMENTS

Preferably, the control unit of the vehicle approach notification device (5') turns off the first illumination portion and turns on or blinks the second illumination portion and the third illumination portion when the travel state is travel stop and the elevation position is equal to or higher than the threshold value.

Preferably, the first illumination portion and the second illumination portion of the vehicle approach notification device are provided such that axes of the first notification light and the second notification light intersect on the rear road surface when the elevation position is equal to the threshold value.

Preferably, a color of the second notification light of the vehicle approach notification device is different from a color of the first notification light.

Preferably, the control unit of the picking truck (5') turns off the first illumination portion and turns on or blinks the second illumination portion and the third illumination portion when the travel state is travel stop and the elevation position is equal or higher than the threshold value.

The first illumination portion of the picking truck may be provided on a head guard of the cab.

The third illumination portion of the picking truck may be provided in an upper portion of the vehicle body so as not to deviate from an upper space of the vehicle body.

Preferably, the first illumination portion and the second illumination portion of the picking truck are provided such that axes of the first notification light and the second notification light intersect on the rear road surface when the elevation position is equal to the threshold value.

Preferably, a color of the second notification light for the picking truck is different from a color of the first notification light.

According to the disclosure, it is possible to provide a vehicle approach notification device and a picking truck capable of reliably notifying a person near the vehicle of an approaching vehicle.

Hereinafter, embodiments of a vehicle approach notification device and a picking truck according to the disclosure will be described with reference to the accompanying drawings.

EXAMPLE

Figure 1:
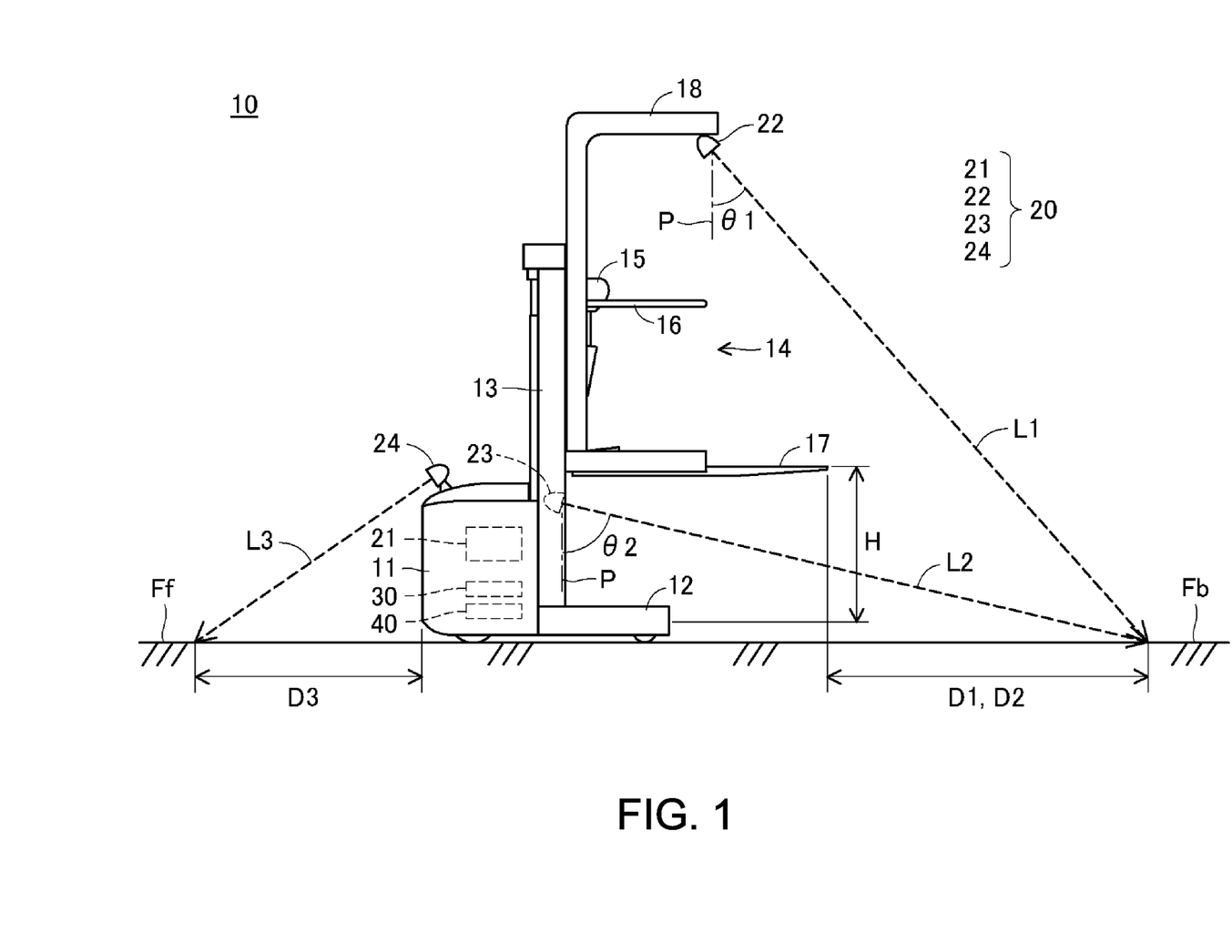
FIG. 1 is a schematic side view of a picking truck according to an embodiment of the disclosure.

FIG. 1 shows a picking truck 10 according to an embodiment of the disclosure. As shown in the drawing, the picking truck 10 according to this embodiment includes a vehicle body 11 having a travel device, legs 12, 12 aligned left and right and a mast 13 provided at the rear of the vehicle body 11; and a cab 14 capable of elevation along the mast 13. The cab 14 includes an operation panel 15 including various levers operated by an operator, a fall guard 16 for preventing the operator from falling; a pair of left and right forks 17, 17 extending rearward; and a head guard 18 that covers an operator's head. The forks 17, 17 are provided on a floor plate of the cab 14.

The picking truck 10 according to this embodiment further includes a control unit 21, a first illumination portion 22, a second illumination portion 23, and a third illumination portion 24 which constitute a vehicle approach notification device 20; an elevation position detection portion 30; and a travel state detection portion 40.

The first illumination portion 22 is composed of an LED light that irradiates a first notification light L1 toward a road surface Fb behind the vehicle. An image of the first notification light L1 appearing on the road surface Fb may be circular with an ambiguous outline, or it may be spot-shaped, line-shaped, or arrow-shaped with a clear outline by the action of lens or slit provided in the first illumination portion 22. Moreover, the color of the first notification light L1 is preferably a color that stands out against the road surface Fb in order to enhance the notification effect. In this embodiment, the color of the first notification light L1 is blue.

The first illumination portion 22 is provided at a rear end of the head guard 18 via a suitable bracket (not shown). The first illumination portion 22 is provided such that its irradiation direction (that is, an axis of the first notification light L1) forms an angle θ1 with respect to a vertical line P.

The second illumination portion 23 is composed of an LED light that irradiates a second notification light L2 toward the road surface Fb behind the vehicle. Similar the image of the first notification light L1, an image of the second notification light L2 appearing on the road surface Fb may be circular with an ambiguous outline, or it may be spot-shaped, line-shaped, or arrow-shaped with a clear outline. Also, the color of the second notification light L2 is preferably a color that stands out against the road surface Fb, and more preferably different from the color of the first notification light L1 in order to enhance the notification effect. In this embodiment, the color of the second notification light L2 is red.

The second illumination portion 23 is provided on the vehicle body 11 via a suitable bracket (not shown). The second illumination portion 23 is provided such that its irradiation direction (that is, an axis of the second notification light L2) forms an angle θ2 with respect to the vertical line P (wherein θ2>θ1).

The third illumination portion 24 is composed of an LED light that irradiates a third notification light L3 toward a road surface Ff in front of the vehicle. Similar to the images of the other notification lights L1 and L2, an image of the third notification light L3 appearing on the road surface Ff may be circular with an ambiguous outline, or it may be spot-shaped, line-shaped, or arrow-shaped with a clear outline. Also, the color of the third notification light L3 is preferably a color that stands out against the road surface Ff in order to enhance the notification effect. In this embodiment, the color of the third notification light L3 is blue.

The third illumination portion 24 is provided at an upper portion of the vehicle body 11 via a bracket so as not to deviate from an upper space of the vehicle body 11. Note that if the third illumination portion 24 deviates from the upper space of the vehicle body 11, the minimum turning radius of the picking truck 10 increases and the maneuverability deteriorates.

Figure 2:
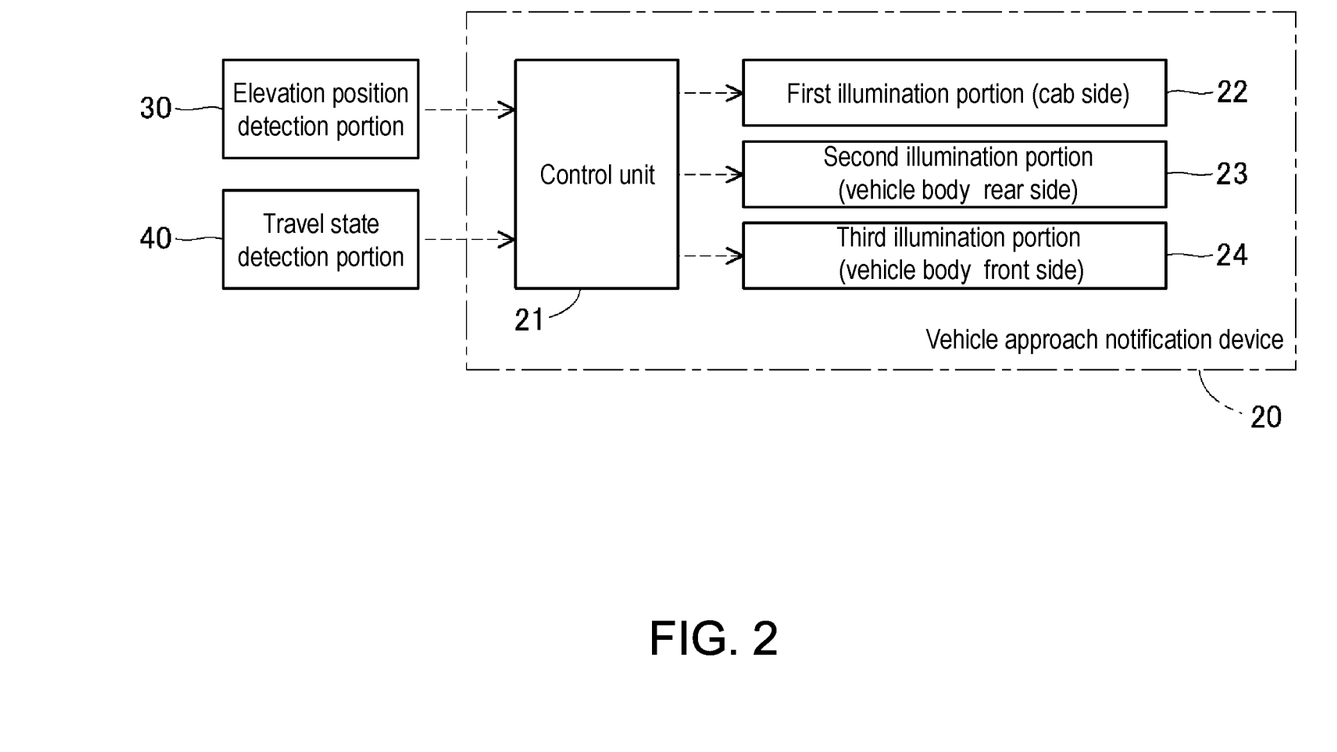
FIG. 2 is a block view of a vehicle approach notification device according to an embodiment of the disclosure.

As shown in FIG. 2, the control unit 21 is configured to change lighting states of the first illumination portion 22, the second illumination portion 23 and the third illumination portion 24 according to an elevation position H of the cab 14 detected by the elevation position detection portion 30 and a travel state of the vehicle body 11 detected by the travel state detection portion 40.

Note that although the control unit 21 is provided inside the vehicle body 11 as shown FIG. 1, the position of the control unit 21 may be changed arbitrarily. For example, the control unit 21 may be provided in the cab 14. Moreover, in FIG. 1, the elevation position detection portion 30 and the travel state detection portion 40 are provided inside the vehicle body 11, but their positions may also be changed arbitrarily.

The operation of the picking truck 10 and the vehicle approach notification device 20 according to this embodiment will be described in more detail with reference to FIGS. 1, 3 and 4.

(1) When the Travel State is Backward Travel and the Elevation Position H is Lower than a Threshold Value Hth In this case, the control unit 21 turns on the first illumination portion 22 and turns off the second illumination portion 23 and the third illumination portion 24. As a result, a blue image by the first notification light L1 appears on the road surface Fb behind the vehicle. Moreover, an example of "when the elevation position H is lower than a threshold value Hth" is when the elevation position H is equal to a lower limit value Hmin, as shown in (A) of FIG. 4.

A distance D1 from tips of the forks 17, 17 to a center of the image of the first notification light L1 is referred to as a "first irradiation distance". As shown in (C) of FIG. 3, a first irradiation distance D1 changes according to the elevation position H. More specifically, the first irradiation distance D1 becomes longer as the elevation position H becomes higher.

In this embodiment, the threshold value Hth is 1 m. The threshold value Hth is set to a value such that the second notification light L2 is not blocked by the cab 14 when the elevation position H is equal to the threshold value Hth.

Since the third illumination portion 24 is configured to irradiate light onto the road surface Ff in front of the vehicle, it hardly contributes to preventing contact between the picking truck 10 traveling backward and a person in the vicinity. Thus, in this embodiment, by turning off the third illumination portion 24 at backward travel, the power consumption of the third illumination portion 24 at backward travel is made substantially zero.

(2) When the Travel State is Backward Travel and the Elevation Position H is Equal to or Higher than the Threshold Value Hth In this case, the control unit 21 turns off the first illumination portion 22 and the third illumination portion 24 and turns on the second illumination portion 23. As a result, a red image by the second notification light L2 appears on the road surface Fb behind the vehicle. The reason for turning off the third illumination portion 24 is as described above.

A distance D2 from the tips of the forks 17, 17 to a center of the image of the second notification light L2 is referred to as a "second irradiation distance". In this embodiment, the threshold value Hth and the angles θ1 and θ2 are determined such that the first irradiation distance D1 and a second irradiation distance D2 are equal (see FIGS. 1 and (C) of 3) when the elevation position H is equal to the threshold value Hth. That is, in this embodiment, axes of the first notification light L1 and the second notification light L2 intersect on the road surface Fb when the elevation position H is equal to the threshold value Hth. As a result, it is possible to prevent the image of the notification light from instantaneously moving when the elevation position H becomes equal to the threshold value Hth, thereby preventing a person in the vicinity from losing sight of the image.

Figure 3:
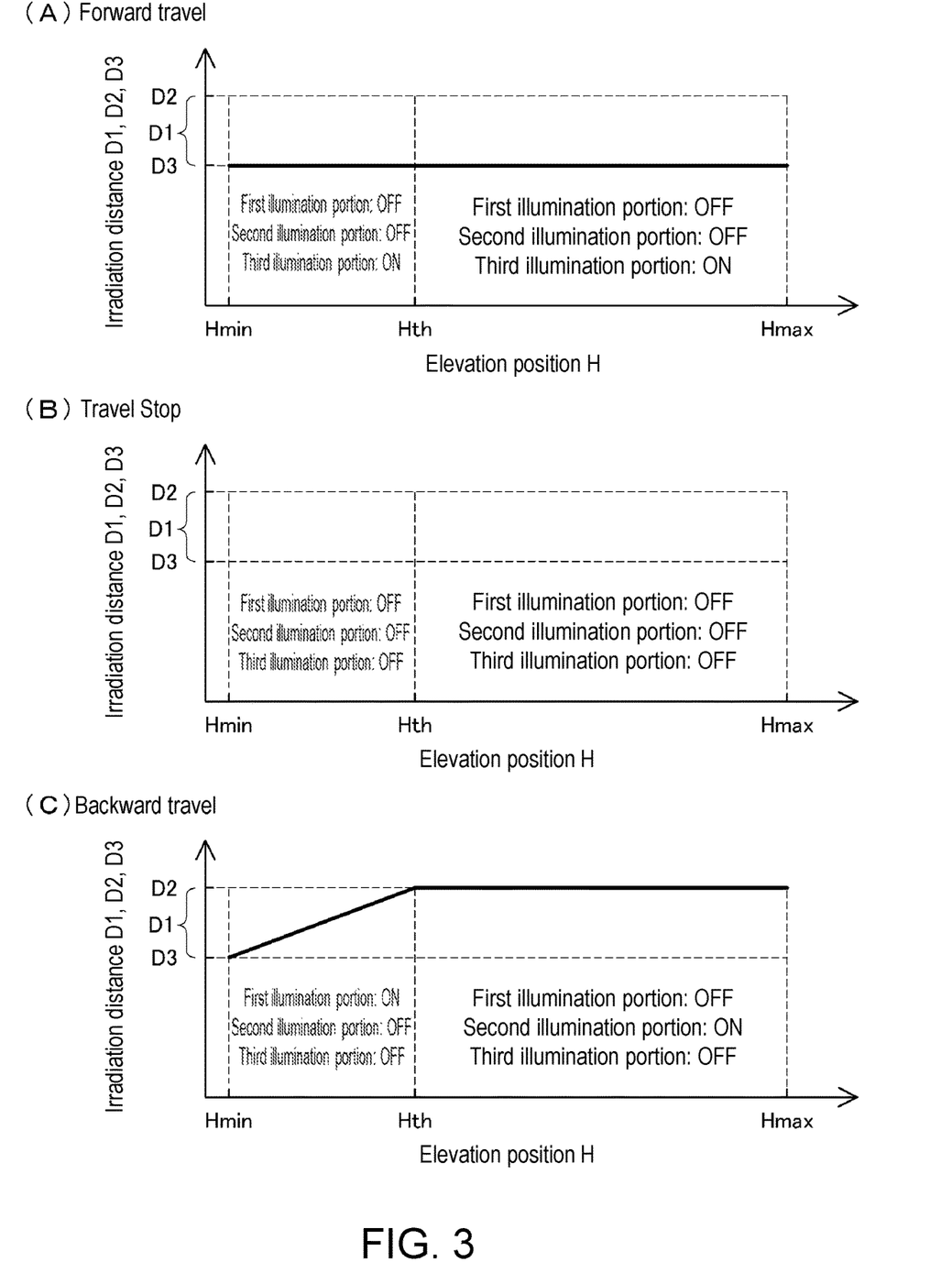
Figure 4:
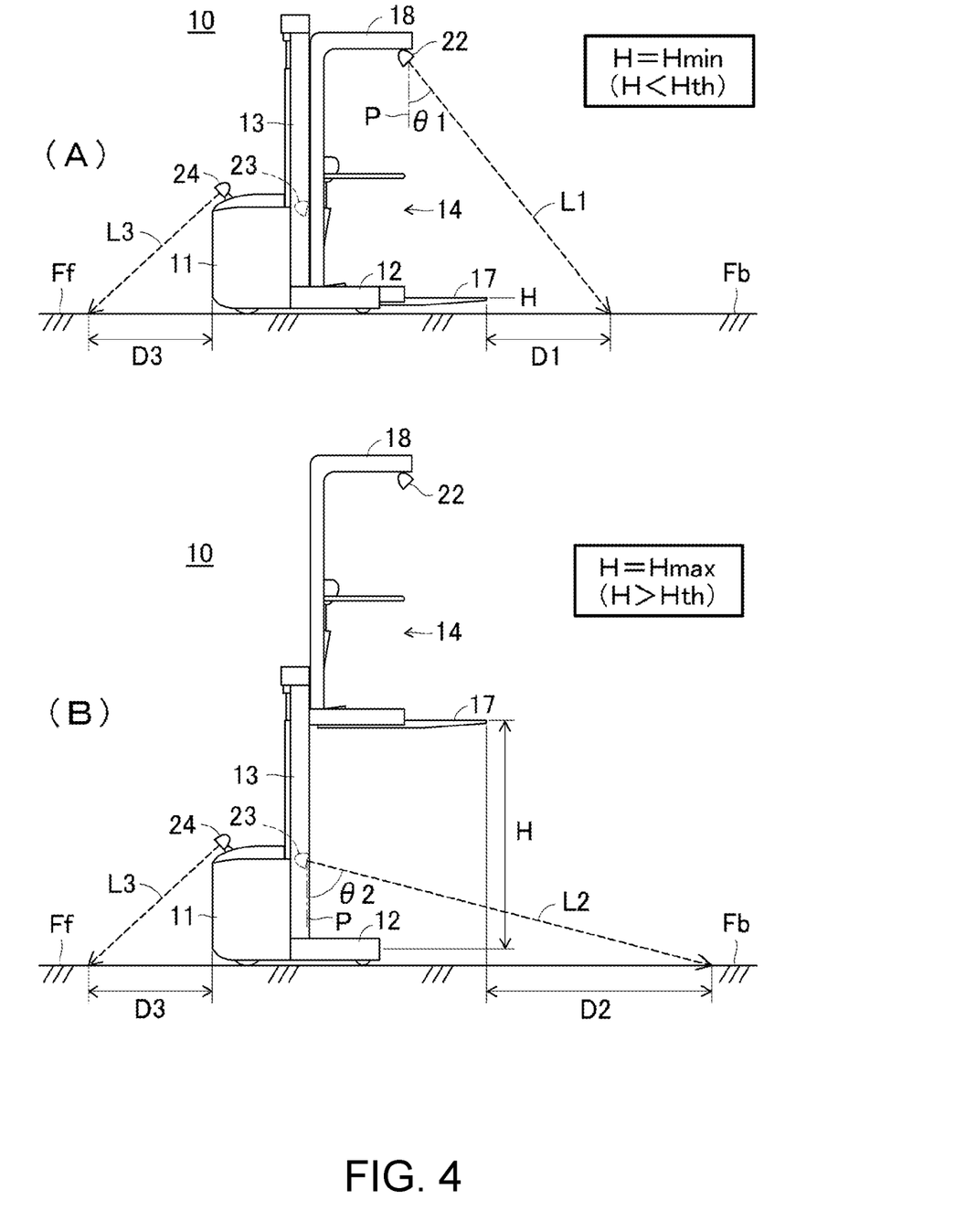

As shown in (C) of FIG. 3, according to the picking truck 10 and the vehicle approach notification device 20 of this embodiment, the second irradiation distance D2 does not change even if the elevation position H changes between the threshold value Hth and an upper limit Hmax. Thus, according to the picking truck 10 and the vehicle approach notification device 20 of this embodiment, there will always be sufficient notification light delivered to the road surface Fb. In other words, according to the picking truck 10 and the vehicle approach notification device 20 of this embodiment, it is possible to prevent a decrease in the notification effect in the case of high lifting height.

Further, according to the picking truck 10 and the vehicle approach notification device 20 according of this embodiment, the color of the image appearing on the road surface Fb changes according to the elevation position H. While the operator of the picking truck 10 tends to be less aware of people around him in the case of high lifting height, according to the picking truck 10 and the vehicle approach notification device 20 of this embodiment, people in the surroundings will become aware of the high lifting height based on the color of the image appearing on the road surface Fb and be more cautious of the surroundings, thereby preventing contact with the picking truck 10 by themselves.

(3) When the Travel State is Forward Travel

In this case, the control unit 21 turns off the first illumination portion 22 and the second illumination portion 23 and turns on the third illumination portion 24 regardless of the elevation position H (see (A) of FIG. 3). As a result, a blue image by the third notification light L3 appears on the road surface Ff in front of the vehicle.

A distance D3 from a front end of the vehicle body 11 to the center of the image of the third notification light L3 is called a "third irradiation distance". In this embodiment, the first irradiation distance D1 and a third irradiation distance D3 are substantially equal when the elevation position H is equal to the lower limit value Hmin.

Since the first illumination portion 22 and the second illumination portion 23 are configured to irradiate light onto the road surface Fb behind the vehicle, they hardly contribute to preventing contact between the picking truck 10 traveling forward and a person in the vicinity. Thus, in this embodiment, by turning off the first illumination portion 22 and the second illumination portion 23 at forward travel, their power consumption at forward travel is made substantially zero.

(4) When the Travel State is Travel Stop

In this case, the control unit 21 turns off the first illumination portion 22, the second illumination portion 23, and the third illumination portion 24 regardless of the elevation position H (see (B) of FIG. 3).

There is a low possibility that a person in the vicinity will come into contact with the picking truck 10 that is at travel stop. That is, at travel stop, the necessity of turning on the first illumination portion 22, the second illumination portion 23, and the third illumination portion 24 is low. Thus, in this embodiment, by turning off all of the illumination portions 22, 23, and 24 at travel stop, the power consumption at travel stop is made substantially zero.

Summarizing (1) to (4), the control unit 21 controls the lighting states of the first illumination portion 22, the second illumination portion 23, and the third illumination portion 24 as shown in the table below.

TABLE 1

| Travel state | Elevation position H | First illumination portion | Second illumination portion | Third illumination portion |
| --- | --- | --- | --- | --- |
| Forward travel | * | OFF | OFF | ON |
| Travel stop | * | OFF | OFF | OFF |
| Backward travel | Lower than Hth | ON | OFF | OFF |
| | Equal to Hth or higher | OFF | ON | OFF |

As described above, according to the picking truck 10 and the vehicle approach notification device 20 of this embodiment, the first illumination portion 22 or the second illumination portion 23 is turned on during backward travel, and the third illumination portion 24 is turned on during forward travel. Thus, according to the picking truck 10 and the vehicle approach notification device 20 of this embodiment, it is possible to reliably notify people around the vehicle of the approach of the vehicle.

Further, according to the picking truck 10 and the vehicle approach notification device 20 of this embodiment, the third illumination portion 24 is turned off at backward travel, the first illumination portion 22 and the second illumination portion 23 are turned off at forward travel, and all the illumination portions 22, 23, and 24 are turned off at travel stop. Thus, according to the picking truck 10 and the vehicle approach notification device 20 of this embodiment, wasteful power consumption that does not contribute to preventing contact can be avoided.

Modified Example

The embodiment of the vehicle approach notification device and the picking truck according to the disclosure has been described above, but the configuration of the disclosure is not limited thereto.

Figure 5:
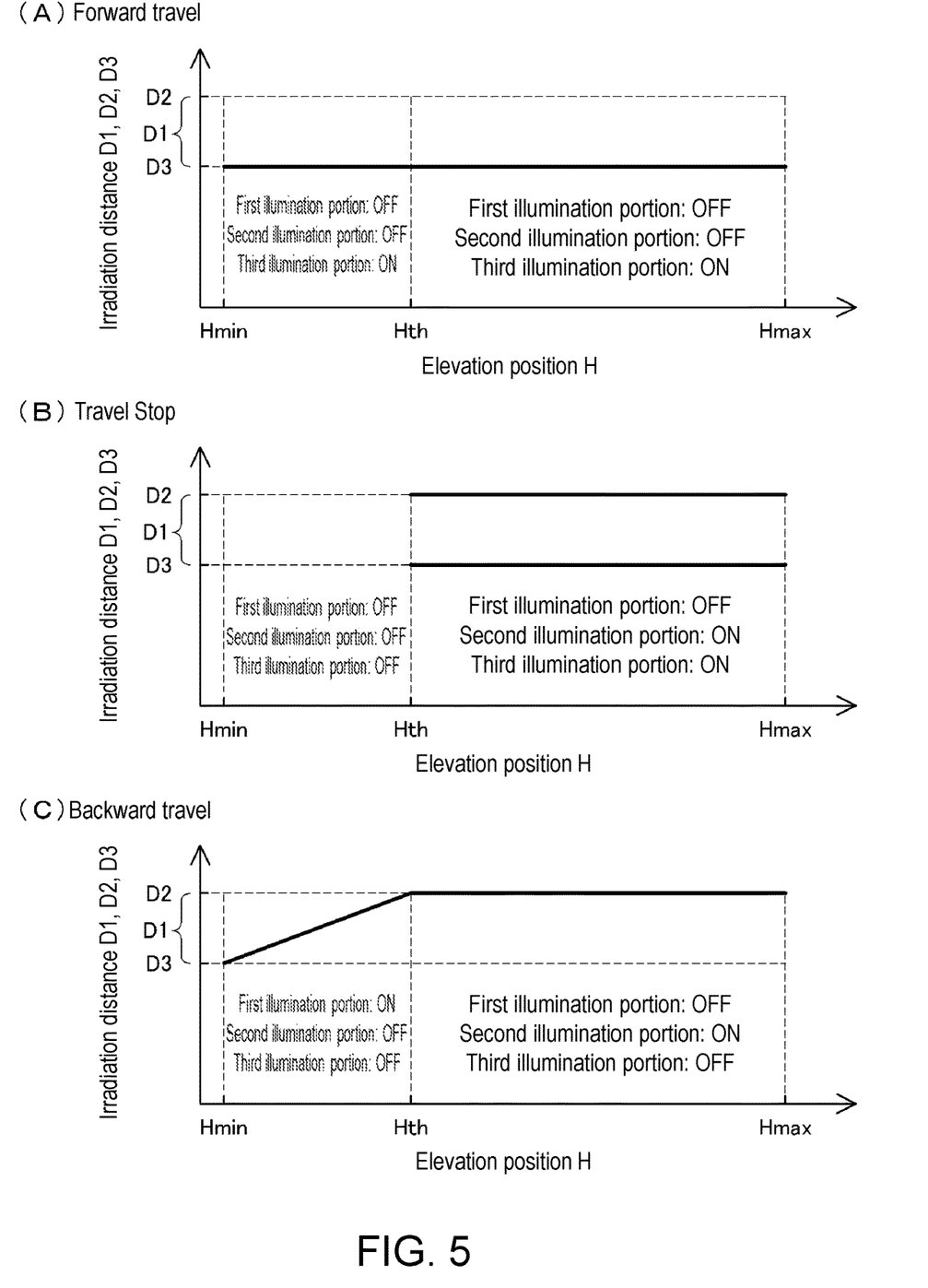
Figure 6:
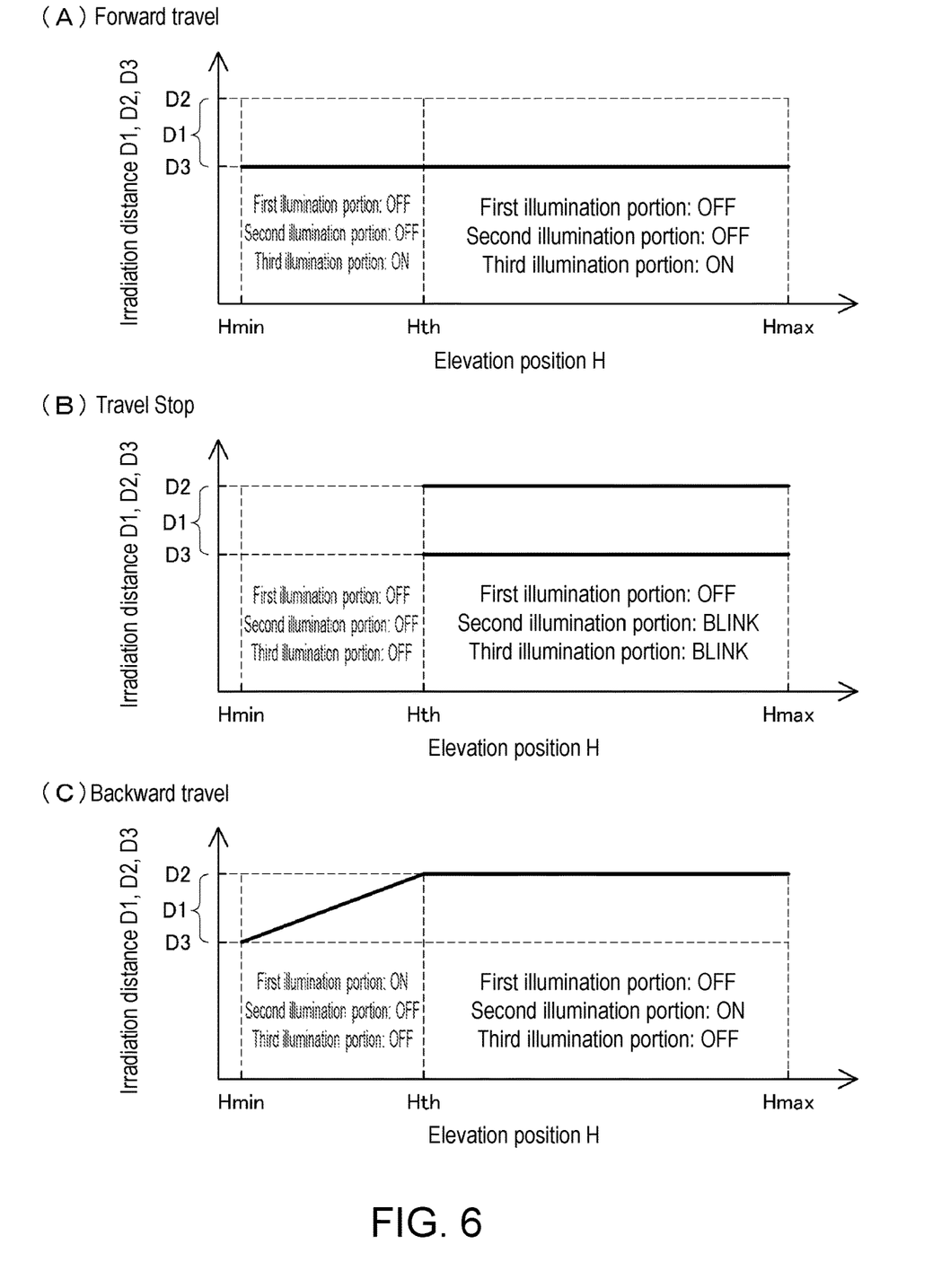

For example, in this disclosure, the control unit 21 may turn on (refer to Table 2 and FIG. 5) or blink (refer to Table 3 and FIG. 6) the second illumination portion 23 and the third illumination portion 24 even when the travel state is travel stop as long as the elevation position H is equal to or higher than the threshold value Hth.

TABLE 2

| Travel state | Elevation position H | First illumination portion | Second illumination portion | Third illumination portion |
| --- | --- | --- | --- | --- |
| Forward travel | * | OFF | OFF | ON |
| Travel stop | Lower than Hth | OFF | OFF | OFF |
| | Equal to Hth or higher | OFF | ON | ON |
| Backward travel | Lower than Hth | ON | OFF | OFF |
| | Equal to Hth or higher | OFF | ON | OFF |

TABLE 3

| Travel state | Elevation position H | First illumination portion | Second illumination portion | Third illumination portion |
| --- | --- | --- | --- | --- |
| Forward travel | * | OFF | OFF | ON |
| Travel stop | Lower than Hth | OFF | OFF | OFF |
| | Equal to Hth or higher | OFF | BLINK | BLINK |
| Backward travel | Lower than Hth | ON | OFF | OFF |
| | Equal to Hth or higher | OFF | ON | OFF |

As described above, there is a low possibility that a person in the vicinity will come into contact with the picking truck 10 that is at travel stop. However, when anyone in the vicinity should happen to come into contact with the picking truck 10 in the case of high lifting height, the cab 14 may shake and the operator working at height may be in danger of falling. By turning on or blinking the second illumination portion 23 and the third illumination portion 24, the possibility of contact between the picking truck 10 and a person in the vicinity is further reduced, and the safety of working at height can be improved.

Moreover, in the disclosure, the first illumination portion 22 may be provided at any position on the cab 14.

Further, in the disclosure, when the elevation position H is equal to the threshold value Hth, the first irradiation distance D1 and the second irradiation distance D2 do not necessarily have to match.

Moreover, the color (blue) of the first notification light L1, the color (red) of the second notification light L2, and the color (blue) of the third notification light L3 are merely examples. In the disclosure, the colors of the first notification light L1, the second notification light L2, and the third notification light L3 may be all the same, partly the same, or all different.

The aforementioned threshold value Hth (1m) is also merely an example.

What is claimed is:

1. A vehicle approach notification device, comprising:
a first illumination portion provided in a cab capable of elevation in a vehicle and irradiating a first notification light toward a rear road surface, which is a road surface behind the vehicle;
a second illumination portion provided on a vehicle body incapable of elevation in the vehicle and irradiating a second notification light toward the rear road surface;
a third illumination portion provided on the vehicle body and irradiating a third notification light toward a front road surface, which is a road surface in front of the vehicle; and
a control unit controlling a lighting state of the first illumination portion, the second illumination portion, and the third illumination portion according to a travel state of the vehicle body and an elevation position of the cab,
wherein the control unit turns on the first illumination portion and turns off the second illumination portion and the third illumination portion when the travel state is backward travel and the elevation position is lower than a predetermined threshold value; turns off the first illumination portion and the third illumination portion and turns on the second illumination portion when the travel state is backward travel and the elevation position is equal to or higher than the threshold value; turns off the first illumination portion and the second illumination portion and turns on the third illumination portion when the travel state is forward travel; turns off the first illumination portion, the second illumination portion, and the third illumination portion when the travel state is travel stop and the elevation position is lower than the threshold value; and turns off the first illumination portion and turns off, blinks, or turns on the second illumination portion and the third illumination portion when the travel state is travel stop and the elevation position is equal to or higher than the threshold value.

2. The vehicle approach notification device according to claim 1,
wherein the control unit turns off the first illumination portion and turns on or blinks the second illumination portion and the third illumination portion when the travel state is travel stop and the elevation position is equal or higher than the threshold value.

3. The vehicle approach notification device according to claim 2,
wherein the first illumination portion and the second illumination portion are provided such that axes of the first notification light and the second notification light intersect on the rear road surface when the elevation position is equal to the threshold value.

4. The vehicle approach notification device according to claim 2,
wherein a color of the second notification light is different from a color of the first notification light.

5. The vehicle approach notification device according to claim 1,
wherein the first illumination portion and the second illumination portion are provided such that axes of the first notification light and the second notification light intersect on the rear road surface when the elevation position is equal to the threshold value.

6. The vehicle approach notification device according to claim 1,
wherein a color of the second notification light is different from a color of the first notification light.

7. A picking truck, comprising:
a vehicle body comprising a travel device;
a mast provided behind the vehicle body;
a cab capable of elevation along the mast;
a first illumination portion provided in the cab and irradiating a first notification light toward a rear road surface, which is a road surface behind a vehicle;
a second illumination portion provided on the vehicle body and irradiating a second notification light toward the rear road surface;
a third illumination portion provided on the vehicle body and irradiating a third notification light toward a front road surface, which is a road surface in front of the vehicle; and
a control unit controlling a lighting state of the first illumination portion, the second illumination portion, and the third illumination portion according to a travel state of the vehicle body and an elevation position of the cab,
wherein the control unit turns on the first illumination portion and turns off the second illumination portion and the third illumination portion when the travel state is backward travel and the elevation position is lower than a predetermined threshold value; turns off the first illumination portion and the third illumination portion and turns on the second illumination portion when the travel state is backward travel and the elevation position is equal to or higher than the threshold value; turns off the first illumination portion and the second illumination portion and turns on the third illumination portion when the travel state is forward travel; turns off the first illumination portion, the second illumination portion, and the third illumination portion when the travel state is travel stop and the elevation position is lower than the threshold value; and turns off the first illumination portion and turns off, blinks, or turns on the second illumination portion and the third illumination portion when the travel state is travel stop and the elevation position is equal to or higher than the threshold value.

8. The picking truck according to claim 7,
wherein the control unit turns off the first illumination portion and turns on or blinks the second illumination portion and the third illumination portion when the travel state is travel stop and the elevation position is equal to or higher than the threshold value.

9. The picking truck according to claim 8,
wherein the first illumination portion is provided on a head guard of the cab.

10. The picking truck according to claim 8,
wherein the third illumination portion is provided in an upper portion of the vehicle body so as not to deviate from an upper space of the vehicle body.

11. The picking truck according to claim 8,
wherein the first illumination portion and the second illumination portion are provided such that axes of the first notification light and the second notification light intersect on the rear road surface when the elevation position is equal to the threshold value.

12. The picking truck according to claim 8,
wherein a color of the second notification light is different from a color of the first notification light.

13. The picking truck according to claim 7,
wherein the first illumination portion is provided on a head guard of the cab.

14. The picking truck according to claim 7,
wherein the third illumination portion is provided in an upper portion of the vehicle body so as not to deviate from an upper space of the vehicle body.

15. The picking truck according to claim 7,
wherein the first illumination portion and the second illumination portion are provided such that axes of the first notification light and the second notification light intersect on the rear road surface when the elevation position is equal to the threshold value.

16. The picking truck according to claim 7,
wherein a color of the second notification light is different from a color of the first notification light.

* * * * *